(12) United States Patent
Fisher et al.

(10) Patent No.: US 7,900,254 B1
(45) Date of Patent: Mar. 1, 2011

(54) IDENTIFYING MALWARE INFECTED REPLY MESSAGES

(75) Inventors: Lee Adam Fisher, Aylesbury (GB);
Gregory Charles Day, Aylesbury (GB);
Jason Brown, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 1290 days.

(21) Appl. No.: 10/350,183

(22) Filed: Jan. 24, 2003

(51) Int. Cl.
*G08B 23/00* (2006.01)
(52) U.S. Cl. ...................................... 726/22
(58) Field of Classification Search ............... 726/22
See application file for complete search history.

(56) References Cited

U.S. PATENT DOCUMENTS

| | | | |
|---|---|---|---|
| 5,832,208 A * | 11/1998 | Chen et al. | 726/24 |
| 6,178,505 B1 | 1/2001 | Schneider et al. | |
| 6,266,681 B1 * | 7/2001 | Guthrie | 715/501.1 |
| 6,785,732 B1 * | 8/2004 | Bates et al. | 709/232 |
| 2002/0049610 A1 * | 4/2002 | Gropper | 705/1 |
| 2003/0065941 A1 * | 4/2003 | Ballard et al. | 713/201 |
| 2003/0097409 A1 * | 5/2003 | Tsai | 709/206 |
| 2004/0107362 A1 * | 6/2004 | Ravishankar et al. | 713/201 |
| 2004/0131056 A1 * | 7/2004 | Dark | 370/386 |
| 2004/0177120 A1 * | 9/2004 | Kirsch | 709/206 |
| 2005/0227668 A1 * | 10/2005 | Thorson et al. | 455/410 |

FOREIGN PATENT DOCUMENTS

| | | |
|---|---|---|
| WO | WO 01/60019 | 8/2001 |
| WO | WO 02/13469 | 2/2002 |

* cited by examiner

*Primary Examiner* — Matthew B Smithers
*Assistant Examiner* — Tamara Teslovich
(74) *Attorney, Agent, or Firm* — Zilka-Kotab, PC

(57) ABSTRACT

A technique for identifying reply mailer computer program viruses detects whether a reply message is generated in less than a threshold reply time and whether or not the reply message includes an attachment. The generation of a reply message in less than a threshold reply time and including an attachment is deemed indicative of an infected reply message and accordingly that message will be quarantined, deleted, disinfected or the like. The mail server using the present technique maintains a temporary log of email messages sent indicating the sender, the recipient, and the time of sending. This log is used to identify replies and determine whether or not those replies have been received in less than the reply threshold time.

33 Claims, 6 Drawing Sheets

Reference event log

| From | To | Time |
|---|---|---|
| UserA | UserB | TimeX |
| UserC | UserD | TimeY |
| · | · | · |
| · | · | · |
| · | · | · |

Threshold reply times

| | Server 1 | Server 2 | |
|---|---|---|---|
| UserA | ThresA1 | ThresA2 | ···· |
| UserB | ThresB1 | ThresB2 | ···· |
| · | · | · | |
| · | · | · | |
| · | · | · | |

IDENTIFYING MALWARE INFECTED REPLY MESSAGES

BACKGROUND OF THE INVENTION

1. Field of the Invention

This invention relates to the field of data processing systems. More particularly, this invention relates to the identification of malware infected reply messages, such as, for example, reply email messages infected with computer viruses, worms, Trojans etc.

2. Description of the Prior Art

An increasingly common and serious malware threat is that of email propagated computer viruses, worms, Trojans and other items of malware. Using email propagation, such items of malware can rapidly multiply and spread to an extent that causes considerable disruption and economic damage. One type of email propagation involves so called mass mailer viruses. When a computer is infected with such a mass mailer virus, then the mass mailer virus sends itself to some or all of the email addresses in the infected computer's email address book. An outbreak of a mass mailer virus can be identified by observing the email usage characteristics of an email server, such as noting the occurrence of a large number of emails being sent to a large number of different recipients, the occurrence of a large number of emails sharing a common title, a common attachment, or other common features. This type of characteristic behaviour can be identified and anti-malware actions, such as quarantining etc, taken even before a new virus has been fully identified and a proper signature identified and distributed. Existing computer programs which serve to monitor email server behaviour to identify this type of mass mailer virus include Outbreak Manager produced by Network Associates, Inc.

A new type of malware has emerged which propagates by email and has the potential for causing considerable damage and yet does not give rise to characteristic patterns of email traffic that can be proactively detected using the known techniques as mentioned above. These so called reply mailer viruses act on an infected computer by waiting for an email to be received from another computer user and then automatically replying to that specific other computer user with an infected reply email. This infected reply email can reuse the message title of the originating email from that other user and the other user will recognise the sender of the infected reply email as a person known to them. Furthermore, the receipt of a reply email of some sort by the other user will not be unexpected since they have just themselves initiated the email exchange. The result is that the recipient of the infected reply email is likely to consider the infected reply email as genuine and open or deal with it in other ways which cause their computer to become infected.

The known techniques for dealing with mass mailing computer viruses are ineffective against reply mailer computer viruses since the reply is generally made to a single user making the increase in email traffic relatively slight, the email titles can be copied from the originating email messages giving no consistent title that identifies an infected email and there is no sending of a single email message to a large group of recipients which could otherwise be suspicious. Thus, until the specific virus signature for the reply mailer virus has been developed and deployed in the email virus scanning systems, then the known types of email scanners are unable to detect and accordingly provide a defense against reply mailer viruses.

SUMMARY OF THE INVENTION

Viewed from one aspect the present invention provides a computer program product for controlling a computer to identify a malware infected message, said computer program product comprising:

reply time detecting code operable to detect a reply message generated in less than a threshold reply time from a reference event associated with a corresponding originating message;

attachment status detecting code operable to detect an attachment status of said reply message matching a trigger attachment status; and infected message identifying code operable to identify said reply message as a malware infected message if said reply message was generated in less than said threshold reply time and said reply message has an attachment status matching said trigger attachment status.

The present technique recognises that relatively distinctive characteristics of the behaviour of a reply mailer virus and other malware operating upon a similar principle is that the reply message is generated quickly and the reply message has an attachment carrying the infection. Infected behaviour is of the type whereby a reply message is generated very rapidly, for example in a matter of milliseconds after the originating message is sent, in a manner which would not occur as a result of a genuine user opening the originating message, reading the originating message, composing a reply to the originating message and then sending that reply. However, this characteristic cannot be used in itself as there are some known legitimate automated reply generating mechanisms, such as out of office mechanisms, which will rapidly generate a reply message when an originating email is received. However, a further feature of an infected reply message is that it will have an attachment carrying the infection. Also requiring this characteristic helps to avoid false triggers based upon legitimate out of office mechanisms which do not utilise attachments but merely send a simple message in the form of plain text indicating, for example, that the recipient will be unable to read or reply until a certain date.

The present technique uses a combination of a reply message being generated in less than a threshold reply time and an attachment status of the reply message matching a trigger attachment status in order to identify a message as an infected message. This mechanism is able to provide a defense against malware, such as reply mailer viruses, by detecting their characteristic behaviour rather than having to wait until a specific virus detecting signature has been developed and deployed. The higher level of protection against this new type of malware threat is strongly advantageous.

The rapid generation of the reply message which is detected is relative to a reference event associated with the originating message. This reference event could take a variety of different forms, but in preferred embodiments is one of the sending of the originating message or the reading of the originating message. The reading of the originating message may be the reading of the originating message by the mail client program of the receiving user from the mail server database as opposed to the reading of the message by a human user.

The attachment status associated with the reply message could take a variety of different forms. A simple type of attachment status may be the presence or absence of an attachment of any sort. The presence of an attachment of any sort may be taken as a characteristic of the type of malware behaviour for which identification is being sought. Increased selectivity and reduced false alarms can be achieved by seeking to detect attachment status corresponding to the presence of an attachment having a size exceeding a threshold attachment size (this type of malware behaviour requires an amount of coding which is relatively large and thus provides a practical minimum size for an attachment that may carry an infection) or an attachment file type matching a type which can carry computer code to be execute, such as an EXE, COM or VBS file type or the like.

The originating message and the reply message can take a variety of different forms. Current message forms to which the present technique is directly applicable are email messages. However, it is possible that the technique may be applied to other types of message that can carry malware.

It will be appreciated that the threshold reply time varies depending upon the particular characteristics of the system operating the technique, e.g. the processing speed, communication link speed, memory capacity etc. In order to deal with this variability, preferred embodiments of the invention provide a calibration mechanism whereby a calibrating originating message is generated, a calibrating reply message automatically generated and the time between the generation of the calibrating originating message and the generation of the calibrating reply message measured to provide a basis upon which the threshold reply time can be set. The calibrating behaviour is intended to follow the type of behaviour that this sort of malware would show and accordingly be subject to roughly similar processing times giving at least a starting point for the determination of threshold reply times.

These threshold reply times can be calculated for a mail server as a whole, individual users on the mail server or possibly even individual users on a mail server in respect of mail being sent to specific other mail servers or within the same mail server.

It will be appreciated that the malware being identified could take a wide variety of different forms, such as a computer program virus, a computer program worm, a computer program Trojan etc. Other types of malware may also share this type of behaviour.

Viewed from another aspect the present invention also provides a method of identifying a malware infected message, said method comprising the steps of:

detecting a reply message generated in less than a threshold reply time from a reference event associated with a corresponding originating message;

detecting an attachment status of said reply message matching a trigger attachment status; and identifying said reply message as a malware infected message if said reply message was generated in less than said threshold reply time and said reply message has an attachment status matching said trigger attachment status.

Viewed from a further aspect the invention provides apparatus for identifying a malware infected message, said apparatus comprising:

reply time detecting logic operable to detect a reply message generated in less than a threshold reply time from a reference event associated with a corresponding originating message;

attachment status detecting logic operable to detect an attachment status of said reply message matching a trigger attachment status; and infected message identifying logic operable to identify said reply message as a malware infected message if said reply message was generated in less than said threshold reply time and said reply message has an attachment status matching said trigger attachment status.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
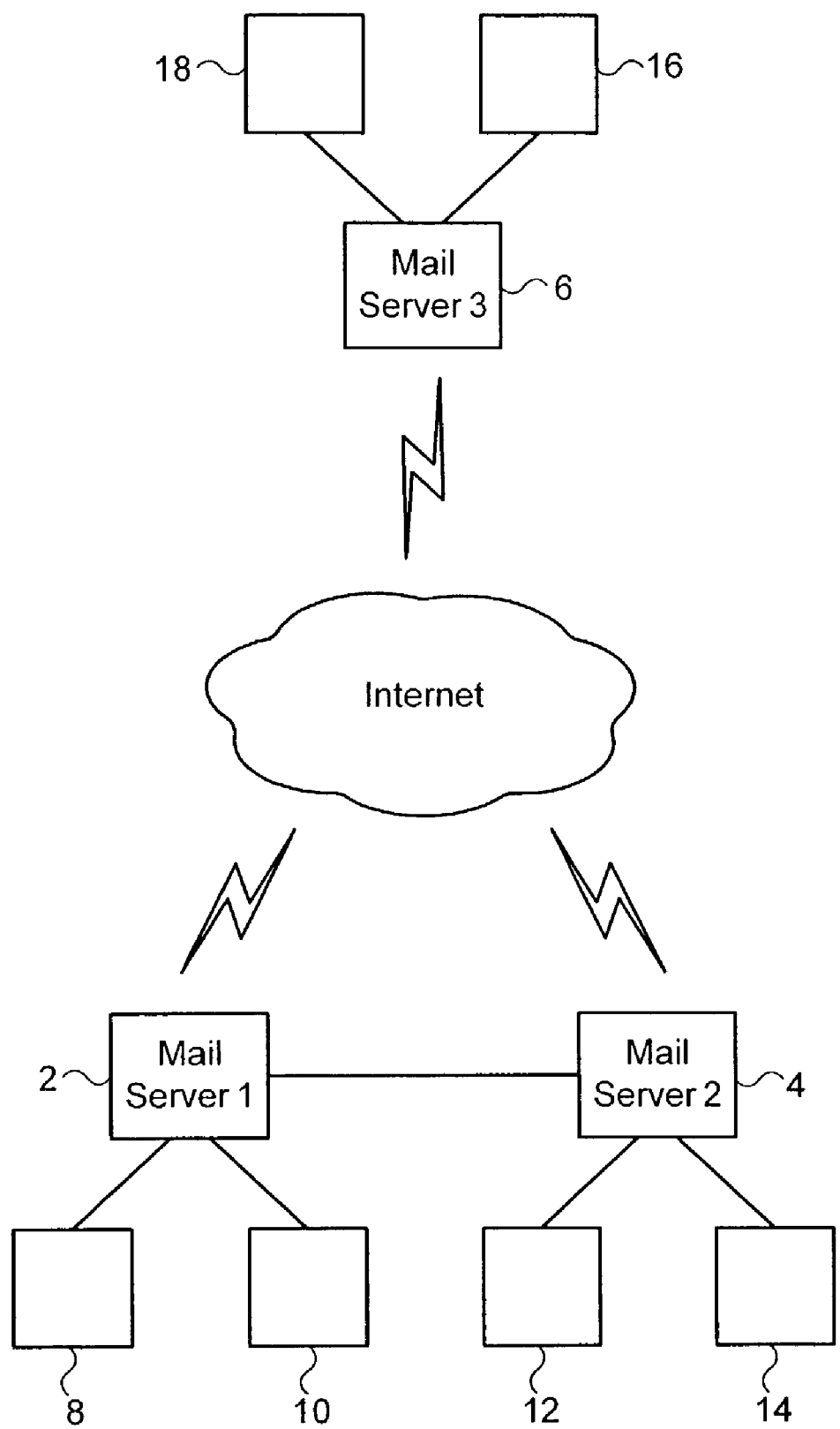
FIG. 1 schematically illustrates communicating email servers with associated users.

FIG. 1 schematically illustrates three email servers 2, 4, 6 each with respective attached users 8, 10, 12, 14, 16 and 18. The email server 2 has a dedicated direct connection to the email server 4, such as may be provided within a large organisation operating multiple sites and utilising different email servers at those sites. The email server 6 is connected via the interne to other email servers in a way that represents a different organisation to which email may be sent.

In operation, when a user 10 sends an email message to another user 10 on the same mail server 2, if the other user 10 is infected with a reply mailer virus, then an infected reply email will be automatically generated by the reply mailer virus and received by the user 8 very rapidly and in a consistent amount of time. In a similar way, an email message originating with the user 8 and sent to the user 14 who is a user of a co-operating mail server 4 will also typically show relatively rapid and consistent reply times when the user 14 is infected.

If the originating email message from the user 8 is being sent to the user 16 on a distant mail server 6, then it is possible that the reply times will be relatively long even when the user 16 is infected. However, whilst it may be more difficult to use the present technique to detect infected reply emails from the mail server 6, this may still be done in some circumstances. Furthermore, it is generally the case that a typical user will receive a large number of emails from within their own organisation and from users connected to their own mail server compared with the number received from elsewhere. Thus, detection of reply mailer computer virus characteristics within a mail server or within a group of consistently connected mail servers is highly beneficial and provides a good degree of protection.

Figure 2:
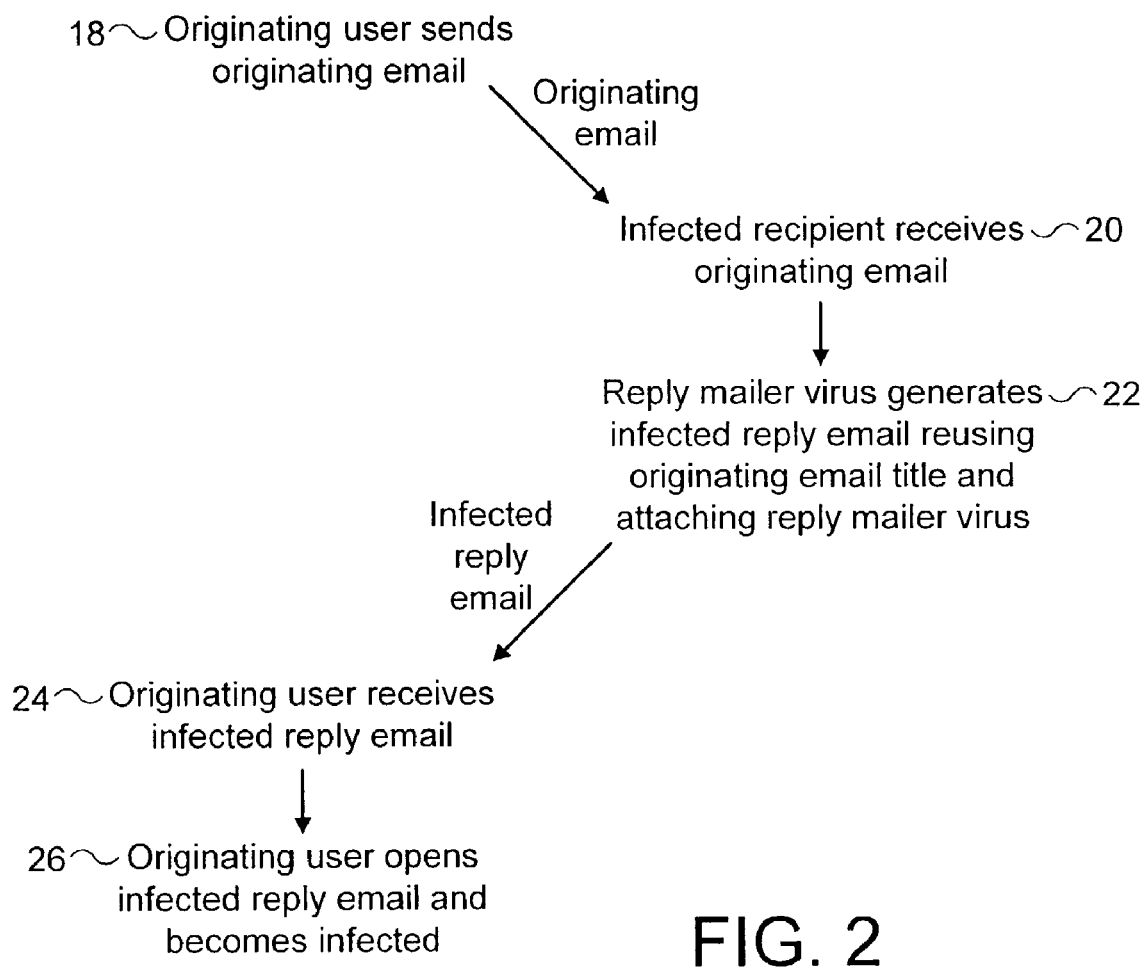
FIG. 2 schematically illustrates reply mailer virus behaviour.

FIG. 2 schematically illustrates the operation of a reply mailer virus. At step 18 an originating non-infected user sends an originating genuine email to an infected recipient. At step 20 the infected recipient receives the originating email. At step 22 the reply mailer virus code which is executing on the infected recipient's computer responds to the received originating email by reading the sender's email address and the originating email title and then generating an infected reply email reusing the email title and directed to the sender of the originating email. The infected reply email may, for example, include some text encouraging the originating user to open the attached reply mailer virus code so that it may be executed and infect the originating user's computer. At step 24 the originating user receives the infected reply email. At step 26 the originating user opens the infected reply email in a manner which leads to their own infection and accordingly propagation of the virus.

Figure 3:
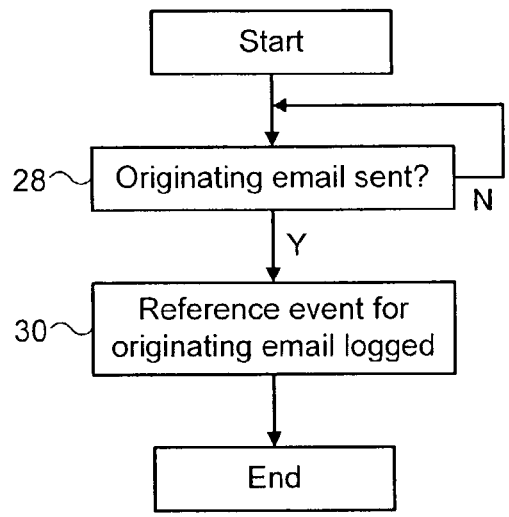
FIG. 3 is a flow diagram schematically illustrating a thread for logging reference events associated with an originating email.

FIG. 3 is a flow diagram schematically illustrating a computer program thread which may execute as part of the mechanisms for implementing the present technique. This thread typically executes as part of a malware scanning program operating on an email server or in association with an email server.

At step 28 a check is made for originating emails being sent from an originating user. When such an originating email is sent, then step 30 serves to generate a stored reference event log entry for the originating email indicating the email address of the sender, the email address of the recipient and the time that the originating email was sent. Processing can then return to step 28 to await the next originating email.

Figure 4:
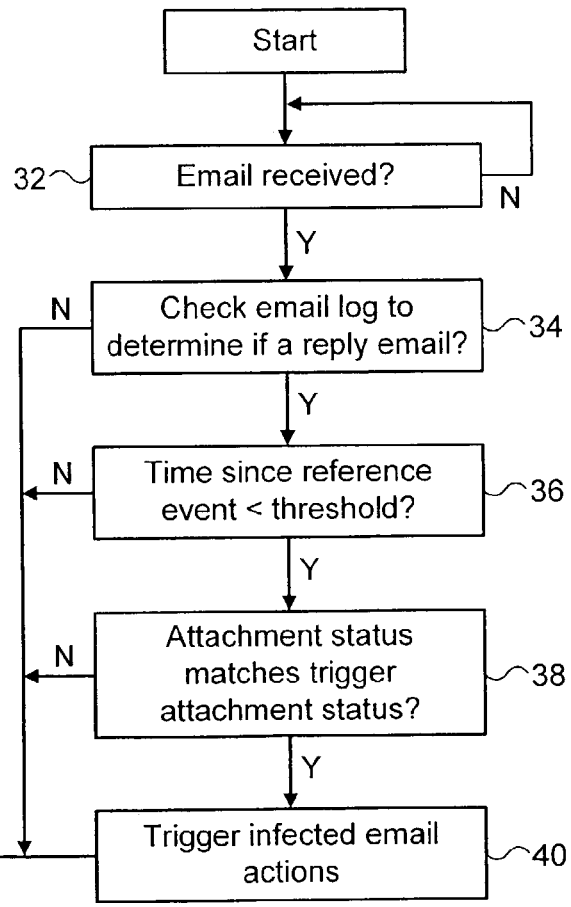
FIG. 4 is a flow diagram schematically illustrating receipt of a reply email and possible identification as an infected reply email.

FIG. 4 is a flow diagram schematically illustrating another computer program thread which operates on the originator's computer. When an email is received at step 32, then processing proceeds to step 34 at which a check is made to determine whether the received email is a reply email. This check may be performed by comparing the sender and recipient of the email received at step 32 with respectively the recipient and the sender of the reference events logged at step 30 of FIG. 3. The reference event log will typically serve to store reference events of originating emails generated within a preceding period of time, such as within the last ten minutes. As reply mailer virus behaviour typically generates infected reply emails within millisecond delay periods, buffering ten minutes worth of logged reference events will typically be more than sufficient to identify potential infected reply emails.

If the determination made at step 34 was that the received email has a sender and recipient matching a recipient and sender in the log, then it will be determined to be a reply email. An additional check for a matching title may be made for improved selectivity, although this is not necessarily required and could lead to a loophole that a virus writer could exploit.

If the determination at step 34 was that the received email was not a reply email, then the thread terminates, or in practice returns to step 32 to await the next received email. If the determination at step 34 was that the received email is a reply email, then processing proceeds to step 36. Step 36 compares the elapsed time from the current time at which the reply email has been received with the logged time for the sending of the originating email and determines if this difference is less than a threshold reply time. If this determination is that the elapsed time is greater than the threshold, then the thread again terminates. If the determination is that the elapsed time is less than the threshold, then processing proceeds to step 38 at which a determination of the attachment status of the received reply email is made.

The attachment status can take a variety of different forms. A simple form is merely to check whether or not there is an attachment. An attachment is required by a reply mailer virus to carry the infection (virus code) to a new victim. Accordingly, the absence of an attachment may be taken to indicate that the received reply email is not infected and may be safely passed to the intended recipient without risk. An example of a rapidly generated reply email without an attachment would be an out of office message generated in response to an originating email message. Further examples of attachment status characteristics being matched could be that the received reply email contains an attachment over a predetermined size sufficient to carry a reply mailer virus or that the attachment has a file type suitable for carrying computer program code that can infect a victim computer.

If the determination at step 38 was that the received reply email has an attachment status matching the trigger attachment status, then processing proceeds to step 40 at which infected email actions, such as quarantining, disinfection, deletion, alert message generation etc may be triggered. If the determination at step 38 was that the attachment statement did not match the trigger attachment status, then the tread will be terminated or returned to step 32 without triggering the infected email actions at step 40.

Figures 5, 6, 8:
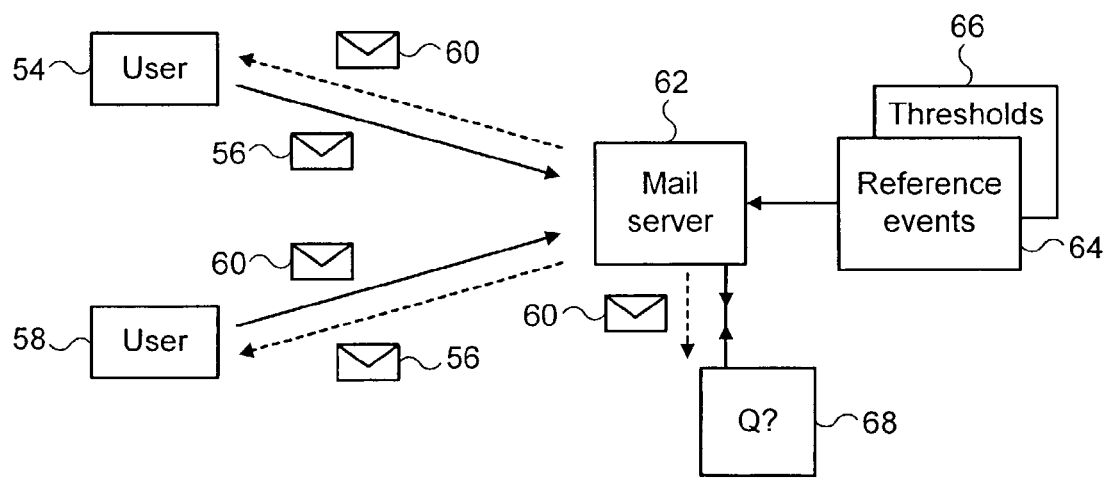
FIG. 5 schematically illustrates a reference event log.
FIG. 6 schematically illustrates a database of threshold reply times.
FIG. 8 is a diagram further illustrating reply mailer computer virus behaviour.

FIG. 5 schematically illustrates a reference event log of the type which may be generated in step 30 of FIG. 3. This reference event log contains records indicating a sender, a recipient and a sending time for each originating email message. It will be appreciated that the reference events logged relate to all email traffic through the email server concerned irrespective of whether or not the email messages are newly composed messages, reply messages in themselves, forwarding of messages or other types of messages. The reference event log will typically keep a log of reference events for a predetermined buffer period.

It will be appreciated that the reference events that are logged could alternatively take the form of recording the time at which an email message was read (notified to the email client of the intended recipient). It is normally this reading/notification at an infected user which enables the reply mailer virus computer program at that infected user to obtain the email address of a new victim. Triggering off the reading/notification time rather than the sending time may be advantageous in dealing with situations in which the recipient has been offline (e.g. not yet logged in for the day) and then becomes active and accordingly allows their infected computer to rapidly generate infected reply messages once they have connected to the email server where their email has been waiting for them.

FIG. 6 schematically illustrates a database of threshold reply times associated with different users. Furthermore, in the example of FIG. 6 the users have respective threshold times associated with more than one recipient email server to which their email may be addressed. In a simple embodiment only a single threshold time may be associated with each user corresponding to rapid reply generation when the recipient is a user connected to the same email server. In a more complicated system, multiple threshold times may be recorded in respect of different email servers to which the user will generally send a relatively large number of email messages and which email servers will respond in a consistent and rapid time when displaying infected behaviour.

Figure 7:
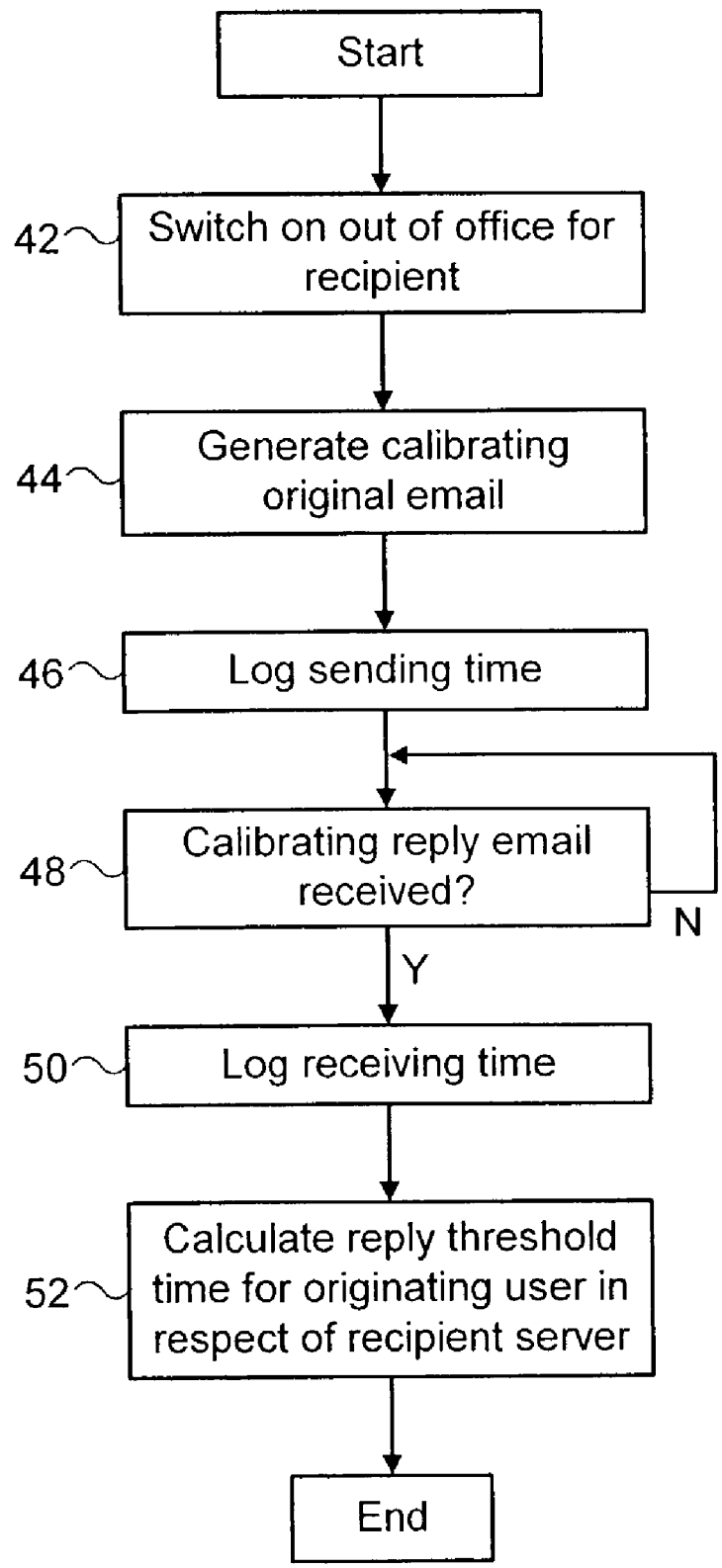
FIG. 7 is a flow diagram schematically illustrating calibration of the threshold reply times.

FIG. 7 is a flow diagram schematically illustrating the calibration of reply threshold times. This calibration procedure may be manually initiated or automatically initiated on a regular basis, or when system configuration changes are made. At step 42 the out of office behaviour for a recipient, which may be a dummy recipient, is switched on. At step 44 a calibrating originating email message is sent to that dummy user so as to trigger the automatic generation of an out of office reply. At step 46, the time at which the calibrating originating message was sent is logged. At step 48 the system waits until the calibrating reply email is received. When this calibrating reply email is received, processing proceeds to step 50 at which the time at which the calibrating reply email is received is logged. At step 52 the times logged at steps 46 and 50 are compared to determine a typical automatic response time for the email message path concerned. This may be subject to a multiplication factor to provide some resistance against false alarms and a reply threshold time thus calculated in respect of the originating user and the recipient email server on the path being calibrated.

FIG. 8 is a further figure illustrating operation of the present technique. A user 54 sends an originating email message 56 to a recipient user 58. The recipient user 58 then generates a reply email message 60. This reply email message may be genuine, such as generated after a user reads and composes a reply, or an automatically generated out of office message not having an attachment, or may be an infected reply message automatically and rapidly generated by a reply mailer computer program virus.

The mail server 62 via which all of these email messages are routed is first to inspect the reply email message 60. It utilises its stored reference event log 64 to determine if the reply email message is a reply or a new email message that should be separately considered. If the reply email message 60 is identified as such, then the mail server 62 references its store of threshold data 66 to determine if the reply email message 60 has been generated in less than a threshold reply time. If the reply email message 60 has been generated in less than the threshold reply time associated with the originating user and the mail server to which the originating email message 60 was sent, then a check is made as to whether or not the reply email message includes an attachment. If the email message does include such an attachment, then the infected message mechanisms are triggered and the reply email message 60 sent to a quarantine store 68 or otherwise processed, such as by disinfection, deletion, triggering generation of an alerting message or the like. If either the reply email message 60 was not generated in less than the threshold reply time or the reply email message 60 did not have an associated attachment, then it is treated as a genuine reply message and returned to the user 54.

Figure 9:
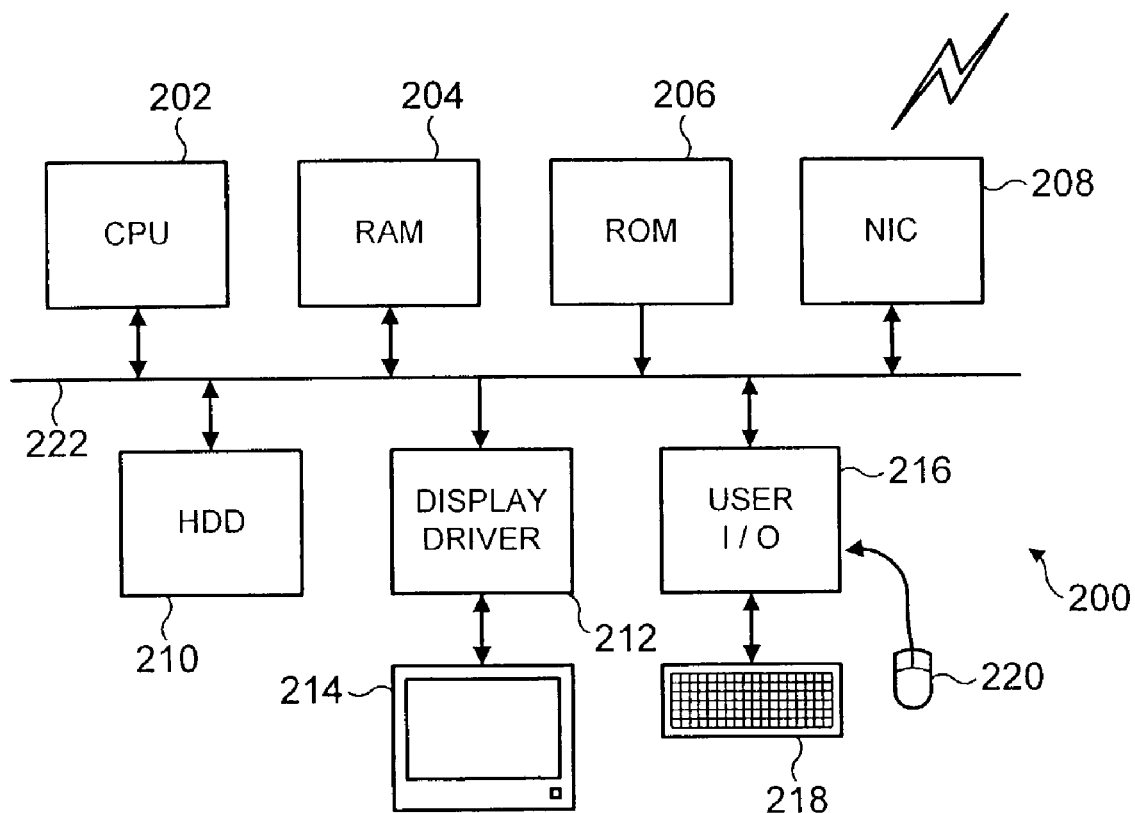
FIG. 9 is a diagram schematically illustrating a general purpose computer of the type which may be used to implement the above techniques.

FIG. 9 schematically illustrates a general purpose computer 200 of the type that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 will execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described technique. The architecture of the general purpose computer 200 could vary considerably and FIG. 9 is only one example.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A recording medium, including at least one of a random access memory, a read only memory and a hard disk drive, encoded with a computer program product executable by a processor of a computer for controlling the computer to identify a malware infected message, said computer program product comprising:

reference event logging code operable to log a reference event associated with a corresponding originating message;

reply time detecting code operable to detect a reply email message generated in less than a threshold reply time from said reference event associated with said corresponding originating message to which said reply email message is a reply;

attachment status detecting code operable to detect an attachment status of said reply email message matching a trigger attachment status;

infected message identifying code operable to identify said reply email message as a malware infected message when said reply email message was generated in less than said threshold reply time and said reply email message has an attachment status matching said trigger attachment status; and performing code operable to perform an action in response to said identification of said reply email message as said malware infected message.

2. A computer program product as claimed in claim 1, wherein said reference event is sending of said originating message.

3. A computer program product as claimed in claim 1, wherein said reference event is reading of said originating message.

4. A computer program product as claimed in claim 1, wherein said trigger attachment status is presence of an attachment with said reply email message.

5. A computer program product as claimed in claim 1, wherein said trigger attachment status is an attachment with said reply email message having one or more of:
a size exceeding a threshold attachment size; and
an attachment file type matching one or more trigger file types.

6. A computer program product as claimed in claim 1, comprising calibrating code operable to calibrate said threshold reply time by:
generating a calibrating originating message;
automatically generating a calibrating reply email message in response to said calibrating originating message; and
measuring a calibration time between generation of said calibrating originating message and generation of said calibrating reply email message.

7. A computer program product as claimed in claim 1, comprising a threshold reply time logging code operable to store a threshold reply time associated with a user.

8. A computer program product as claimed in claim 7, wherein said threshold reply time logging code is operable to store a plurality of threshold reply times respectively associated with different message destinations of said originating message.

9. A computer program product as claimed in claim 8, wherein said different message destinations are different email servers.

10. A computer program product as claimed in claim 1, wherein said malware infected message is infected with one or more of:

a computer program virus;

a computer program worm; and a computer program Trojan.

11. A computer-implemented method of identifying a malware infected message, said method comprising:

logging a reference event associated with a corresponding originating message;

detecting a reply email message generated in less than a threshold reply time from said reference event associated with said corresponding originating message to which said reply email message is a reply, utilizing a central processing unit;

detecting an attachment status of said reply email message matching a trigger attachment status;

identifying said reply email message as a malware infected message when said reply email message was generated in less than said threshold reply time and said reply email message has an attachment status matching said trigger attachment status; and performing an action in response to said identification of said reply email message as said malware infected message.

12. A method as claimed in claim 11, wherein said reference event is sending of said originating message.

13. A method as claimed in claim 11, wherein said reference event is reading of said originating message.

14. A method as claimed in claim 11, wherein said trigger attachment status is presence of an attachment with said reply email message.

15. A method as claimed in claim 11, wherein said trigger attachment status is an attachment with said reply email message having one or more of:

a size exceeding a threshold attachment size; and an attachment file type matching one or more trigger file types.

16. A method as claimed in claim 11, comprising calibrating said threshold reply time by:

generating a calibrating originating message;

automatically generating a calibrating reply email message in response to said calibrating originating message; and measuring a calibration time between generation of said calibrating originating message and generation of said calibrating reply email message.

17. A method as claimed in claim 11, comprising storing a threshold reply time associated with a user.

18. A method as claimed in claim 17, comprising storing a plurality of threshold reply times respectively associated with different message destinations of said originating message.

19. A method as claimed in claim 18, wherein said different message destinations are different email servers.

20. A method as claimed in claim 11, wherein said malware infected message is infected with one or more of:

a computer program virus;

a computer program worm; and a computer program Trojan.

21. Apparatus for identifying a malware infected message, said apparatus comprising:

a central processing unit for carrying out logic, the logic including:

logic for logging a reference event associated with a corresponding originating message;

logic for detecting a reply email message generated in less than a threshold reply time from said reference event associated with said corresponding originating message to which said reply email message is a reply;

logic for detecting an attachment status of said reply email message matching a trigger attachment status;

logic for identifying said reply email message as a malware infected message when said reply email message was generated in less than said threshold reply time and said reply email message has an attachment status matching said trigger attachment status; and logic for performing an action in response to said identification of said reply email message as said malware infected message.

22. Apparatus as claimed in claim 21, wherein said reference event is sending of said originating message.

23. Apparatus as claimed in claim 21, wherein said reference event is reading of said originating message.

24. Apparatus as claimed in claim 21, wherein said trigger attachment status is presence of an attachment with said reply email message.

25. Apparatus as claimed in claim 21, wherein said trigger attachment status is an attachment with said reply email message having one or more of:

a size exceeding a threshold attachment size; and an attachment file type matching one or more trigger file types.

26. Apparatus as claimed in claim 21, comprising calibrating logic operable to calibrate said threshold reply time by:

generating a calibrating originating message;

automatically generating a calibrating reply email message in response to said calibrating originating message; and measuring a calibration time between generation of said calibrating originating message and generation of said calibrating reply email message.

27. Apparatus as claimed in claim 21, comprising a threshold reply time logging logic operable to store a threshold reply time associated with a user.

28. Apparatus as claimed in claim 27, wherein said threshold reply time logging logic is operable to store a plurality of threshold reply times respectively associated with different message destinations of said originating message.

29. Apparatus as claimed in claim 28, wherein said different message destinations are different email servers.

30. Apparatus as claimed in claim 21, wherein said malware infected message is infected with one or more of:

a computer program virus;

a computer program worm; and a computer program Trojan.

31. A computer program product as claimed in claim 1, wherein said reference event is stored for a predetermined buffer period in a reference event log which includes a sender, a recipient, and a sending time associated with said corresponding originating message.

32. A computer program product as claimed in claim 31, wherein said reply email message is determined to be said reply if said reply email message includes a recipient and a sender in said reference event log.

33. A computer program product as claimed in claim 1, wherein said threshold reply time is recorded for each different server to which said reply email message is addressed.

* * * * *